May 1, 1945. A. G. SCHILLO 2,374,783
CAN OPENER
Filed July 10, 1944
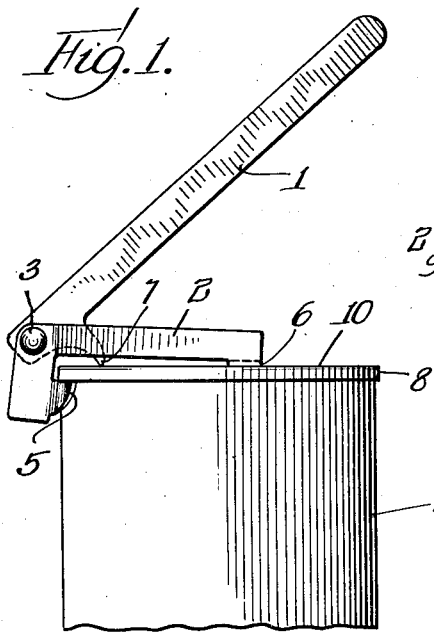
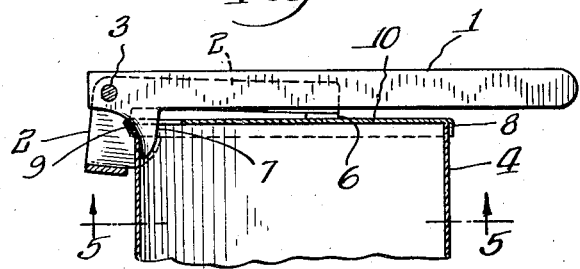
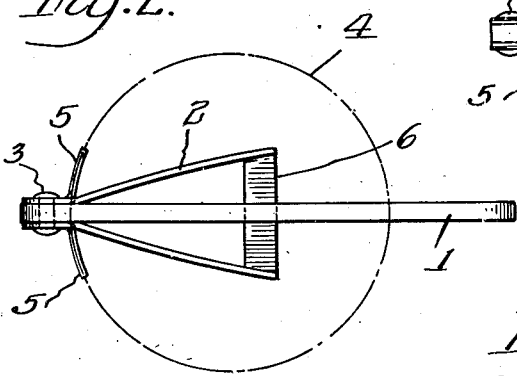
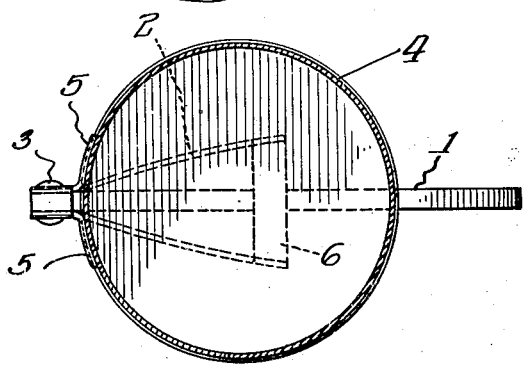
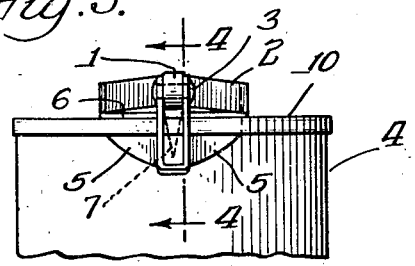
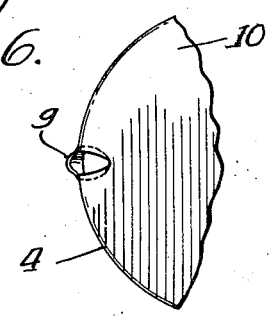
INVENTOR.
Albert G. Schillo
BY Lloyd J. Andres
ATTORNEY.

Patented May 1, 1945

2,374,783

UNITED STATES PATENT OFFICE 2,374,783

CAN OPENER

Albert G. Schillo, Barrington, Ill.

Application July 10, 1944, Serial No. 544,260

2 Claims. (Cl. 30—16)

This article of manufacture relates in general to can openers, and more particularly to a can opener for piercing a metal container and simultaneously forming a spout for aiding in pouring liquids therefrom. Previous devices of this general character for piercing containers, merely provided an aperture, and the resulting aperture having no particular form usually caused the liquid to drip along the outside of the container during or after pouring. In the present invention, this objection is entirely overcome by the forming of a drip proof spout which provides the principal object of the invention.

A further object of the invention is the provision of a lever operated device for manually piercing the cover of a container and simultaneously forming a pouring spout in its edge by a simple movement of the operating lever of the device.

Other objects and advantages of one embodiment of the invention will be apparent in the following drawing and description in which:

Fig. 1 is a side elevation of the opener in position on a conventional tin container.

Fig. 2 is a top view of the device shown in Fig. 1.

Fig. 3 is a side elevation of the device shown Fig. 1 in changed position.

Fig. 4 is a side cross-sectional elevational view of the device taken through section lines 4—4, Fig. 3.

Fig. 5 is a cross-sectional view of the device taken through section lines 5—5, Fig. 4.

Fig. 6 is a fragmentary view of the spout of a conventional cylindrical container with aperture and spout formed in the edge thereof.

Referring to Fig. 1, the can opener consists in general of a handle 1 and a yoke member 2, pivotally connected by a rivet 3. A pair of jaws 5, and a heel piece 6, are formed integral with yoke member 2. A piercing point 7, formed integral with the lever 1, at a predetermined distance from its fulcrum point, or rivet 3, has its forward surface curved to simulate the shape of the spout desired which will be hereinafter described.

The relative position of the parts when fitted to a conventional cylindrical container 4, prior to opening, is shown Fig. 1 with the jaws 5—5 under the flange 8 of the cover 10, the piercing point resting on the cover close to its edge.

In operation the lever is moved downwardly to its extreme position shown Figs. 3 and 4. During this movement, the jaws 5 and the heel piece 6 will impart a pincer action to the point 7 and result in the cover of the container being pierced by the point 7 and the edge of the container formed into an outward extending spout 9 shown Fig. 6. The can opener is removed from the container by raising the handle 1, thus freeing the point 7 from the pierced aperture and releasing the jaws 5 from under the edge of the cover 8.

Having described my invention, I claim:

1. A can opener comprising a lever having an integral piercing point near one end thereof, a locating yoke adapted to fit on the cover of a container, said yoke having a pair of integral jaws for engaging the lower rim of said cover, said lever pivotally secured to said member with the piercing point in proximity of said jaws whereby said point will pierce said cover and form a spout in the edge of said container when the said opener is positioned on said container and said lever is depressed.

2. A can opener comprising a lever having an integral piercing point near one end thereof, a locating member adapted to fit on the cover of a container, said member having a pair of integral jaws at one extremity for engaging the rim of said cover and an integral heel piece for engaging the top surface of said cover, said lever pivotally secured to said member whereby the said piercing point will pierce the said cover near its rim and simultaneously form a pouring spout on the edge of said container when the said opener is positioned on said container and the said lever is depressed.

ALBERT G. SCHILLO.